United States Patent
Zhou et al.

(10) Patent No.: US 9,001,810 B1
(45) Date of Patent: Apr. 7, 2015

(54) MULTIDIMENSIONAL LOAD BALANCING

(71) Applicant: Sprint Spectrum LP, Overland Park, KS (US)

(72) Inventors: Yu Zhou, Herndon, VA (US); Chunmei Liu, Great Falls, VA (US); Daniel Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 136 days.

(21) Appl. No.: 13/760,914

(22) Filed: Feb. 6, 2013

(51) Int. Cl.
*H04W 4/00* (2009.01)
*H04W 28/08* (2009.01)

(52) U.S. Cl.
CPC ..................................... *H04W 28/08* (2013.01)

(58) Field of Classification Search
CPC ... H04W 84/045; H04W 36/18; H04W 52/40; H04W 24/10
See application file for complete search history.

(56) References Cited

U.S. PATENT DOCUMENTS

| | | | |
|---|---|---|---|
| 2005/0265283 A1* | 12/2005 | Qi et al. | 370/331 |
| 2011/0038431 A1 | 2/2011 | Frederiksen et al. | |
| 2012/0140669 A1 | 6/2012 | Wang et al. | |
| 2012/0236717 A1 | 9/2012 | Saska et al. | |

* cited by examiner

*Primary Examiner* — Fan Ng

(57) ABSTRACT

Multiple network resources are considered when distributing network load among access nodes. For example, traffic load, user load, and bearer load may all be considered in the decision to move a wireless device from one access node to another. An N-dimensional load vector is calculated where each of the N dimensions is associated with a network resource utilization factor. A load vector is calculated for each of the access nodes being considered for load balancing. The load vectors for access nodes under consideration for load balancing are subtracted to create a difference vector. When the magnitude of the difference vector is greater than a threshold, the communication system balances the load between the two access nodes.

14 Claims, 5 Drawing Sheets

MULTIDIMENSIONAL LOAD BALANCING

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Elements of these wireless networks (e.g., access nodes or "cells") may become overloaded with, for example, too many users (i.e., wireless devices), or too much data. When this happens, the wireless network may take actions that help prevent a noticeable degradation in the quality of service being provided to users. These actions can include "load balancing" which redistributes work among network elements in order to help prevent degraded or lost service.

Overview

In an embodiment, a method of balancing load among wireless access nodes includes calculating a plurality of load vectors each associated one of plurality of access nodes. These load vectors can be based on a plurality of network resource utilization indicators and a corresponding plurality of basis vectors for each of the plurality of network resource utilization indicators. The load vectors can include at least a first load vector associated with a first access node and a second load vector associated with a second access node. A first magnitude of a first difference vector is calculated. The first difference vector is a vector difference between the first load vector and the second load vector. In response to the first magnitude meeting a threshold requirement, a handoff of a wireless device between the first access node and the second access node can be initiated.

In an embodiment, a communication system includes a first access node. The first access node has a first active connection to a wireless device. The first access node is associated with a first load vector. The first load vector is based on a first plurality of network resource utilization indicators and a corresponding plurality of basis vectors for each of the first plurality of network resource utilization indicators. The communication system also includes a second access node. The second access node is associated with a second load vector. The second load vector is based on a second plurality of network resource utilization indicators and the corresponding plurality of basis vectors for each of the second plurality of network resource utilization indicators. A processing node is configured to determine a first magnitude of a vector difference between the first load vector and the second load vector. The processing node is also configured to cause a handoff of a wireless device between the first access node and the second access node in response to the first magnitude meeting a threshold requirement.

In an embodiment, a method of operating a communication system includes determining a first vector difference between a first load vector and a second load vector. The first load vector is associated with a first plurality of network resource utilization indicators that correspond to the utilization of resources on a first access node. The second load vector is associated with a second plurality of network resource utilization indicators that correspond to the utilization of resources on a second access node. The magnitude of the first vector difference is determined. Based on the magnitude meeting a threshold requirement, the first access node and the second access node are selected for load balancing.

DETAILED DESCRIPTION

In an embodiment, multiple network resources are considered when distributing network load among access nodes. For example, traffic load, user load, and bearer load may all be considered in the decision to move a wireless device from one access node to another. An N-dimensional load vector is calculated where each of the N dimensions is associated with a network resource utilization factor. For example, in 3 dimensions, a load vector may be calculated by associating the traffic load with a first dimension (e.g., x-axis), user load with a second dimension (e.g., y-axis), and bearer load with a third dimension (e.g., z-axis). A load vector is calculated for each of the access nodes being considered for load balancing.

The load vectors for access nodes under consideration for load balancing are subtracted to create a difference vector. When the magnitude of the difference vector is greater than a threshold, the communication system balances the load between the two access nodes (e.g., by moving a wireless device from the access node with the greater load to the access node with the lesser load). In this manner, many network resource limitations can be considered when making load balancing decisions.

Figure 1:
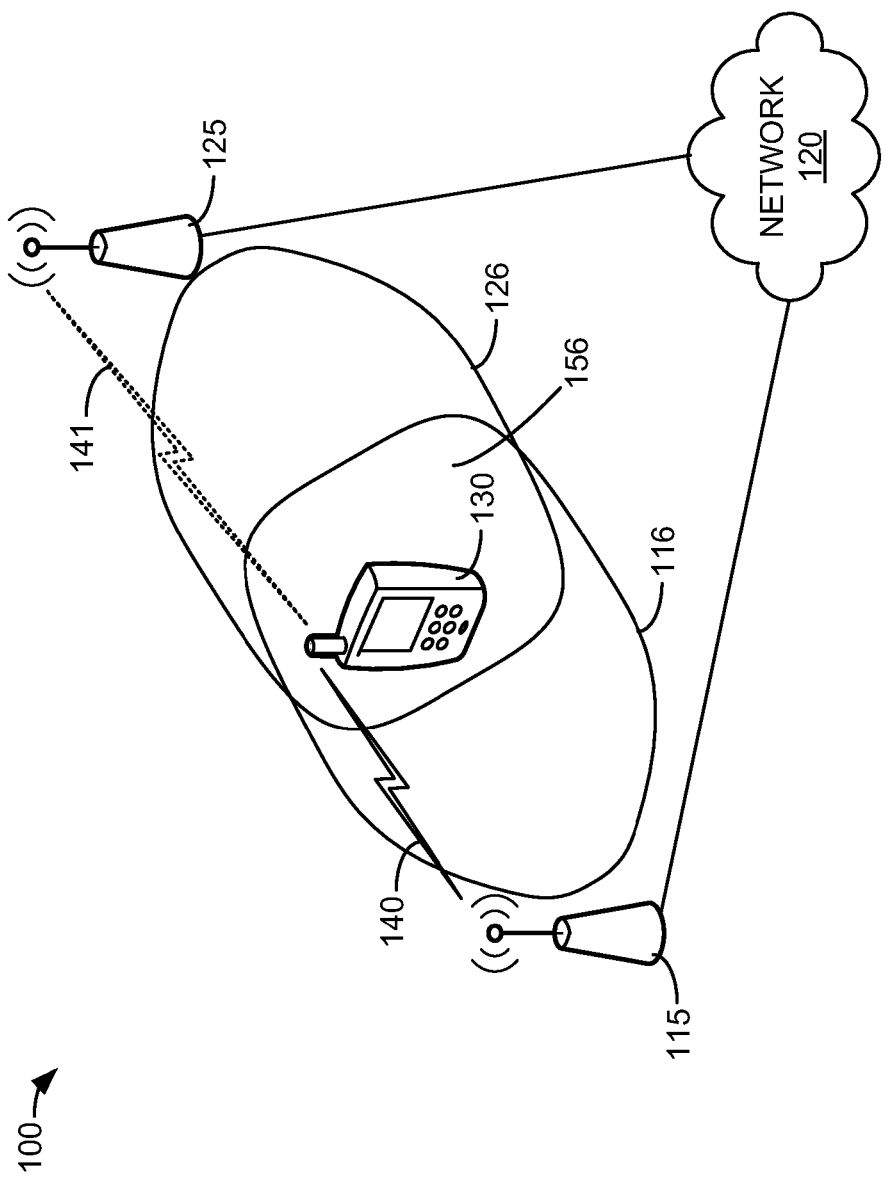
FIG. 1 is a block diagram illustrating a communication system.

FIG. 1 is a block diagram illustrating a communication system. In FIG. 1, communication system 100 comprises access node 115, access node 125, network 120, and wireless device 130. Access node 115 is operatively coupled to network 120. Access node 125 is operatively coupled to network 120. Wireless device 130 is operatively coupled to access node 115 via wireless link 140. Wireless device 130 can be operatively coupled to access node 125 via wireless link 141.

Access node 115 is illustrated as having coverage area 116. Access node 125 is illustrated as having coverage area 126. Coverage area 116 and coverage area 126 overlap in region 156. Wireless device 130 is illustrated in region 156. Thus, it should be understood that wireless device 130 is in a location where it can be served by either access node 115 (via wireless link 140) or access node 125 (via wireless link 141).

Access node 115 and access node 125 are network nodes capable of providing wireless communication to wireless device 130. Access node 115 and/or access node 125 can be, for example, one or more of a base transceiver station, a radio base station, an eNodeB device, or an enhanced eNodeB device. Access node 115 communicates with wireless device 130 via wireless link 140. Access node 125 can communicate with wireless device 130 via wireless link 141.

Communication system 100 is a communication network that can provide wireless communication to wireless device 130. Network 120 is a communication network that can provide communication between access node 115 and access node 125. Communication system 100 and network 120 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 and network 120 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 120 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 140 and/or wireless link 141 can be a radio frequency, microwave, infrared, or other similar signal. Wireless link 140 and/or wireless link 141 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 (and present in network 120, in particular) to facilitate wireless communication to/from wireless device 130 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 130 may be any device, system, combination of devices, or other such communication platform capable of communicating wirelessly with access node 115 and access node 125. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 115 and access node 125. Other types of communication platforms are possible.

Network resources on access node 115, access node 125, or other elements of communication system 100 may have capacity limitations. For example, access node 115 and access node 125 may have a maximum number of physical resource blocks (PRBs) in each transmitted or received frame. Access node 115 and access node 125 may each have a maximum number of active users that can be supported. Access node 115 and access node 125 may each have a maximum number of bearers that can be supported. An indicator of how heavily one of these network resources can be expressed as a real number between 0 and 1. This indicator is called the network load of the resource. Formulas for the network load indicator for three example network resources are given in Table 1.

TABLE 1

$$\text{traffic load} = \frac{\text{number of PRBs used in the frame}}{\text{total number of PRBs in the frame}}$$

$$\text{user load} = \frac{\text{number of active users in the cell}}{\text{maximum number of active users supported in the cell}}$$

$$\text{bearer load} = \frac{\text{number of bearers in the cell}}{\text{maximum number of bearers supported in the cell}}$$

In an embodiment, communication system 100 calculates a plurality of load vectors. Each of these load vectors associated one of plurality of access nodes. For example, a first load vector $\vec{L}_1$ may be associated with access node 115. A second load vector $\vec{L}_2$ may be associated with access node 125. Each of the plurality of load vectors is based on a plurality of network resource utilization indicators and a corresponding plurality of basis vectors for each of the plurality of network resource utilization indicators. For example, the load vector with K network resource, $\vec{L}$, may be calculated according to Table 2.

TABLE 2

$$\vec{L} = a_1 w_1 \vec{e_1} + a_2 w_2 \vec{e_2} + \ldots + a_k w_k \vec{e_K}$$

where:
$a_t$ is the network load of the network resource t, and $1 \leq t \leq K$;
$w_t$ is a weight assigned to the network resource t, and $1 \leq t \leq K$; and,
$\vec{e_t}$ is a basis vector with K number of dimensions associated with network resource t, and $1 \leq t \leq K$.

It should be understood that the weight, $w_t$ can be a selected constant or a function of $a_t$. It should also be understood that the basis vectors $\vec{e}_t$ may or may not be orthogonal to each other. For example, the orthogonal basis vectors of $$\vec{e_1} = \begin{pmatrix} 1 \\ 0 \end{pmatrix}$$

and $$\vec{e_2} = \begin{pmatrix} 0 \\ 1 \end{pmatrix}$$

can be used. In another example, the non-orthogonal basis vectors of $$\vec{e_1} = \begin{pmatrix} 1 \\ 0 \end{pmatrix}$$

and $$\vec{e_2} = \begin{pmatrix} \frac{\sqrt{2}}{2} \\ \frac{\sqrt{2}}{2} \end{pmatrix}$$

can be used.

Communication system 100 calculates the magnitude of at least a first difference vector. This difference vector is a vector difference between the load vectors associated with two access nodes. For example, communication system 100 may calculate the magnitude of the vector difference (d) between vector $\vec{L}_1$ (associated with access node 115) and $\vec{L}_2$ (associated with access node 125) as $d=\|\vec{D}\|=\|\vec{L}_1-\vec{L}_2\|$.

In response to the magnitude of the difference vector meeting a threshold requirement, communication system 100 initiates a handoff of a wireless device between access nodes. In other words, if the magnitude of the difference vector associated with two access nodes (e.g., access node 115 and access node 125) exceeds a predetermined amount, communication system 100 will load balance between the two access nodes.

This process can be extended to additional load vectors that are associated with additional access nodes. For example, a second difference vector can be calculated as the difference between the first load vector and a load vector associated with a third access node (not shown in FIG. 1). If the magnitude of the second difference vector is less than the magnitude of the first difference vector, the first two access nodes may be selected for load balancing even though the magnitude of the second difference meets the threshold requirement. The first two access nodes are selected for load balancing over the third access node because there is a greater difference in load vectors between the first and second access node as compared to the first and third access nodes. In other words, the first and second access nodes are more "out of balance" than the first and third access nodes.

Figure 2:
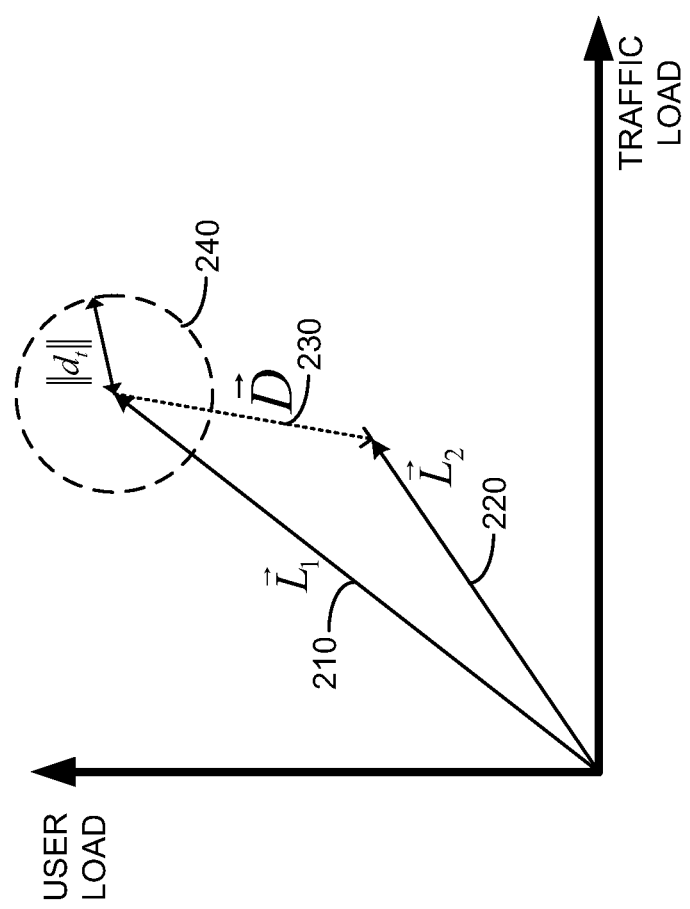
FIG. 2 is an illustration of two-dimensional load vectors.

FIG. 2 is an illustration of two-dimensional load vectors. In FIG. 2, user load is shown in the vertical (y-axis) direction and traffic load is shown in the horizontal (x-axis) direction. A first load vector 210, $\vec{L}_1$, and a second load vector 220, $\vec{L}_2$, are shown. The difference vector 230, $\vec{D}$, is the difference between the first load vector 210, $\vec{L}_1$, and the second load vector 220, $\vec{L}_2$. In other words, $\vec{D}=(\vec{L}_1-\vec{L}_2)$. If the magnitude of difference vector 230, $\vec{D}$, exceeds a threshold amount (i.e., $d_t$—illustrated as the dashed line circle 240 in FIG. 2), communication system 100 initiates load balancing between the access nodes associated with the first load vector 210, $\vec{L}_1$, and the second load vector 220, $\vec{L}_2$.

For example, assuming: (1) all $w_t$ are equal to 1; (2) the traffic load for the first access node and the second access node are both 0.8, and, (3) the user load for the first access node and the second access node are 0.8 and 0.2, respectively. The first load vector 210, $\vec{L}_1$, and the second load vector 220, $\vec{L}_2$ may be calculated as follows:

$$\vec{L_1} = 0.8\begin{pmatrix} 1 \\ 0 \end{pmatrix} + 0.8\begin{pmatrix} 0 \\ 1 \end{pmatrix} = \begin{pmatrix} 0.8 \\ 0.8 \end{pmatrix}$$

$$\vec{L_2} = 0.8\begin{pmatrix} 1 \\ 0 \end{pmatrix} + 0.2\begin{pmatrix} 0 \\ 1 \end{pmatrix} = \begin{pmatrix} 0.8 \\ 0.2 \end{pmatrix}$$

Thus, the magnitude of the load difference vector is:

$$d = \|\vec{L_1} - \vec{L_2}\| = \left\|\begin{pmatrix} 0.8 \\ 0.8 \end{pmatrix} - \begin{pmatrix} 0.8 \\ 0.2 \end{pmatrix}\right\| = \left\|\begin{pmatrix} 0 \\ 0.6 \end{pmatrix}\right\| = 0.6$$

Figure 3:
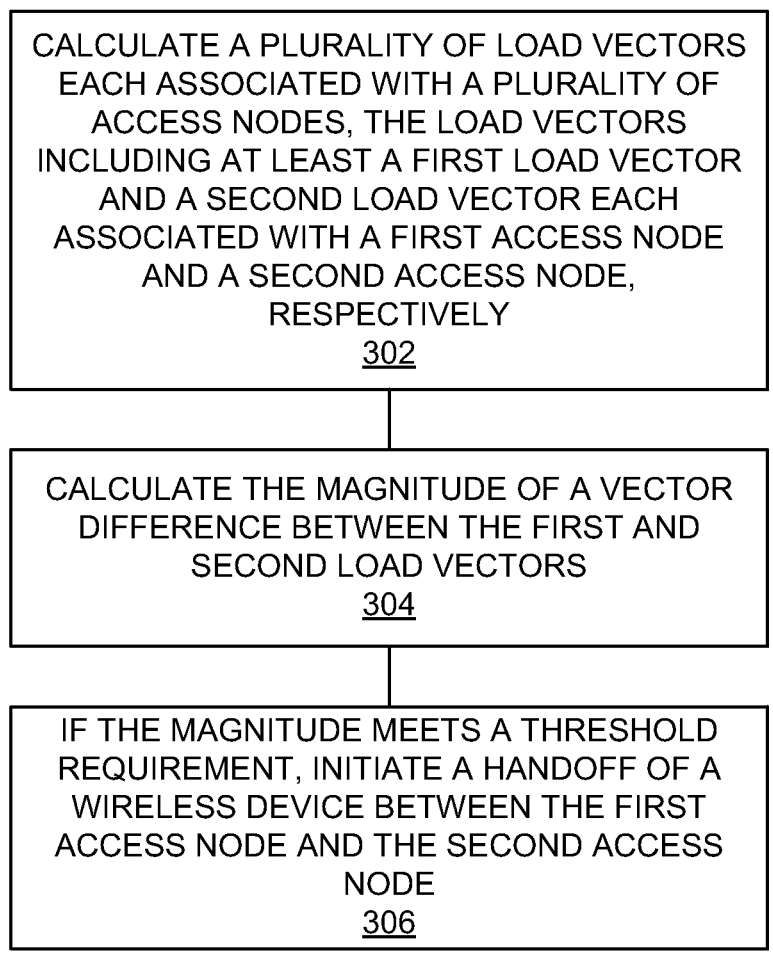
FIG. 3 is a flowchart of a method of balancing load between wireless access nodes.

FIG. 3 is a flowchart of a method of balancing load between wireless access nodes. The steps illustrated in FIG. 3 may be performed by one or more elements of communication system 100. A plurality of load vectors that are each associated with a plurality of access nodes are calculated. The load vectors include at least a first load vector and a second load vector each associated with a first access node and a second access node, respectively (302). For example, a processing node of communication system 100 may calculate a first load vector, $\vec{L}_1$, which is associated with the load on access node 115. A processing node of communication system 100 may calculate a second load vector, $\vec{L}_2$, which is associated with the load on access node 125.

A magnitude of a vector difference between the first and second load vectors is calculated (304). For example, the magnitude of the difference between load vector $\vec{L}_1$ and load vector $\vec{L}_2$ may be calculated. If the magnitude meets a threshold requirement, a handoff of a wireless device between the first access node and the second access node is initiated (306). For example, if the magnitude of the difference between load vector $\vec{L}_1$ and load vector $\vec{L}_2$ exceeds a threshold, communication system 100 can initiate a handoff of wireless device 130 from access node 115 to access node 125.

Figure 4:
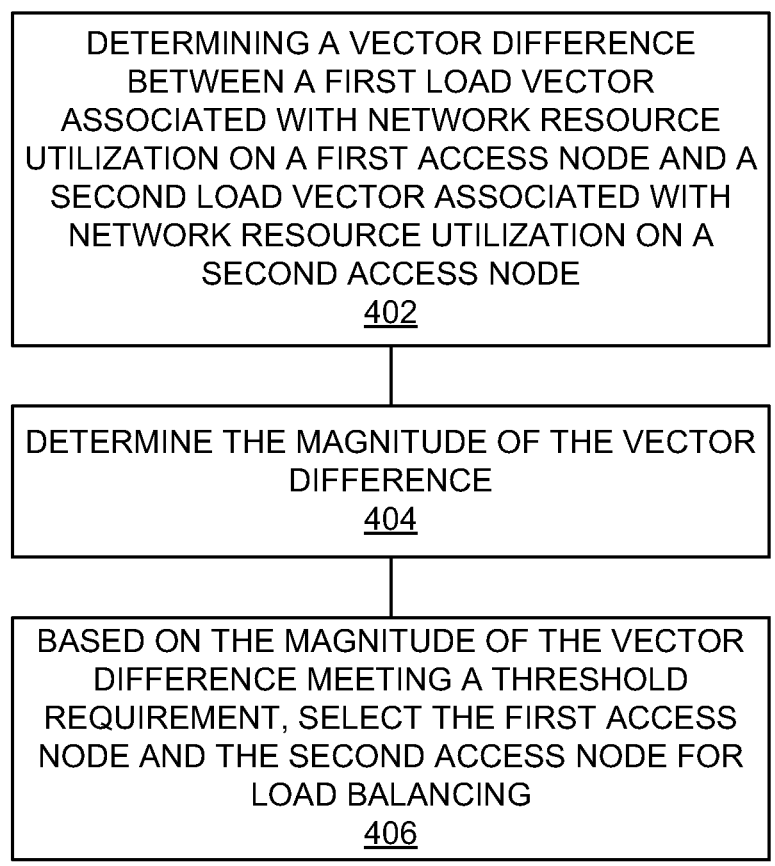
FIG. 4 is a flowchart of a method of operating a communication system.

FIG. 4 is a flowchart of a method of operating a communication system. The steps illustrated in FIG. 4 may be performed by one or more elements of communication system 100. A vector difference between a first load vector associated with network resource utilization on a first access node and a second load vector associated with network resource utilization on a second access node is determined (402). For example, communication system 100 may calculate a vector difference, $\vec{D}$, between load vector $\vec{L_1}$ (which is associated with the network resource utilization on access node 115) and load vector $\vec{L_2}$ (which is associated with the network resource utilization on access node 125.)

The magnitude of the vector difference is determined (404). For example, communication system 100 may calculate the magnitude of vector difference $\vec{D}$. Based on the magnitude of the vector difference meeting a threshold requirement, the first access node and the second access node are selected for load balancing (406). For example, based on the magnitude of vector difference $\vec{D}$ exceeding a threshold $d_t$, communication system 100 may load balance between access node 115 and access node 125. Communication system 100 may load balance between access node 115 and access node 125 by moving one or more wireless device(s) 130 from access node 115 to access node 125.

Communication system 100 may move wireless device(s) 130 from access node 115 to access node 125 by ending a first active connection between access node 115 and wireless device 130 and initiating a second active connection between access node 125 and wireless device 130. Communication system 100 may select wireless device 130 to be moved based on the modulation and coding scheme being used to communicate between wireless device 130 and access node 115.

In an embodiment, the foregoing can be generalized to M wireless devices, N access nodes, and K network resources. For the sake of brevity, network resources will be abbreviated as NR, wireless devices abbreviated UE, and access points abbreviated eNB.

For each network resource, $NR_t$, communication system 100 creates a two-dimensional network load matrix associating wireless devices and access node. The value in each entry (represented as $a_{rst}$) of these matrices represent the network resource load (i.e., network resource number "t") on an access point (i.e., eNB number "s") if the associated wireless device (i.e., UE number "r") attaches to that access point, where $1 \leq r \leq M$, $1 \leq s \leq N$, $1 \leq t \leq K$. An example matrix for network resource $NR_t$ is illustrated in Table 3. In an embodiment, each entry, $a_{rst}$, corresponds to the associated modulation and coding scheme applied for each UE.

TABLE 3

| $NR_t$ | $eNB_1$ | $eNB_2$ | ... | $eNB_N$ |
|---|---|---|---|---|
| $UE_1$ | $a_{11t}$ | $a_{12t}$ | ... | $a_{1Nt}$ |
| $UE_2$ | $a_{21t}$ | $a_{22t}$ | ... | $a_{2Nt}$ |
| ... | ... | ... | ... | ... |
| $UE_M$ | $a_{M1t}$ | $a_{M2t}$ | ... | $a_{MNt}$ |

Communication system 100 also creates an adjacency matrix that indicates whether any two eNBs can load balance between them. Each entry in the adjacency matrix, $b_{ij}$, is set to a one (1) if load balancing is possible between eNB number "i" and eNB number "j". Otherwise, the entry is set to zero (0). An example of the adjacency matrix is given in Table 4.

TABLE 4

| adjacency | $eNB_1$ | $eNB_2$ | ... | $eNB_N$ |
|---|---|---|---|---|
| $eNB_1$ | $b_{11}$ | $b_{12}$ | ... | $b_{1N}$ |
| $eNB_2$ | $b_{21}$ | $b_{22}$ | ... | $b_{2N}$ |
| ... | ... | ... | ... | ... |
| $eNB_N$ | $b_{N1}$ | $b_{n2}$ | ... | $b_{NN}$ |

Each UE can be actively connected to at most one eNB. Communication system 100 creates a connection matrix with entries that indicate a one (1) if $UE_r$ connects to $eNB_s$, otherwise the entries are zero (0). For example, if UE number 4 (i.e., $UE_4$) is connects to eNB number 7 (i.e., $eNB_7$), entry $x_{47}$ would equal 1. An example of the connections matrix is given in Table 5.

TABLE 5

| UE selection | $eNB_1$ | $eNB_2$ | ... | $eNB_N$ |
|---|---|---|---|---|
| $UE_1$ | $X_{11}$ | $X_{12}$ | ... | $X_{1N}$ |
| $UE_2$ | $X_{21}$ | $X_{22}$ | ... | $X_{2N}$ |
| ... | ... | ... | ... | ... |
| $UE_M$ | $x_{M1}$ | $X_{M2}$ | ... | $X_{MN}$ |

Communication system 100 can solve for the $x_{rs}$ illustrated in Table 5 using linear or non-linear programming. Communication system 100 can, for example, solve for the $x_{rs}$ illustrated in Table 5 using the constraints and objective functions given in Table 6. Communication system 100 can perform data collection and processing to solve for the $x_{rs}$ using a processing node.

TABLE 6

Constraint functions:

(1) Each UE actively connects to at most one eNB. This can be expressed as:

$$\forall\ 1 \leq r \leq M : \sum_{s=1}^{N} x_{rs} \leq 1$$

(2) The network resource summation of each eNB is less than its load threshold $T_{st}$. This can be expressed as:

$$\forall\ 1 \leq t \leq K, \forall\ 1 \leq s \leq N : \sum_{r=1}^{M} a_{rst} x_{rs} \leq T_{st}$$

(3) If $eNB_{s'}$ and $eNB_{s''}$ are adjacent and load balanced, then the magnitude of the difference vector between $eNB_{s'}$ and $eNB_{s''}$ should be less than the threshold ($d_t$) for triggering load balancing between $eNB_{s'}$ and $eNB_{s''}$. This can be expressed as:
$\forall 1 \leq s' \leq N, \forall 1 \leq s'' \leq N : \text{if } b_{s's''} = 1, d_{s's''} = d(\vec{L_{s'}}, \vec{L_{s''}}) \leq d_t$
where $$\vec{L_s} = \sum_{r=1}^{M} a_{rs1} x_{rs} w_1 \vec{e_1} + \sum_{r=1}^{M} a_{rs2} x_{rs} w_2 \vec{e_2} + \ldots + \sum_{r=1}^{M} a_{rsK} x_{rs} w_K \vec{e_K}.$$

Objective function: minimize the maximum difference vector magnitude between adjacent eNBs. This can be expressed as:
$\min\{\max(\ d_{s's''}\ )\ |\ \forall 1 \leq s' \leq N, \forall 1 \leq s'' \leq N, b_{s's''} = 1\}$
Please note the definition of the objective function may vary.

Figure 5:
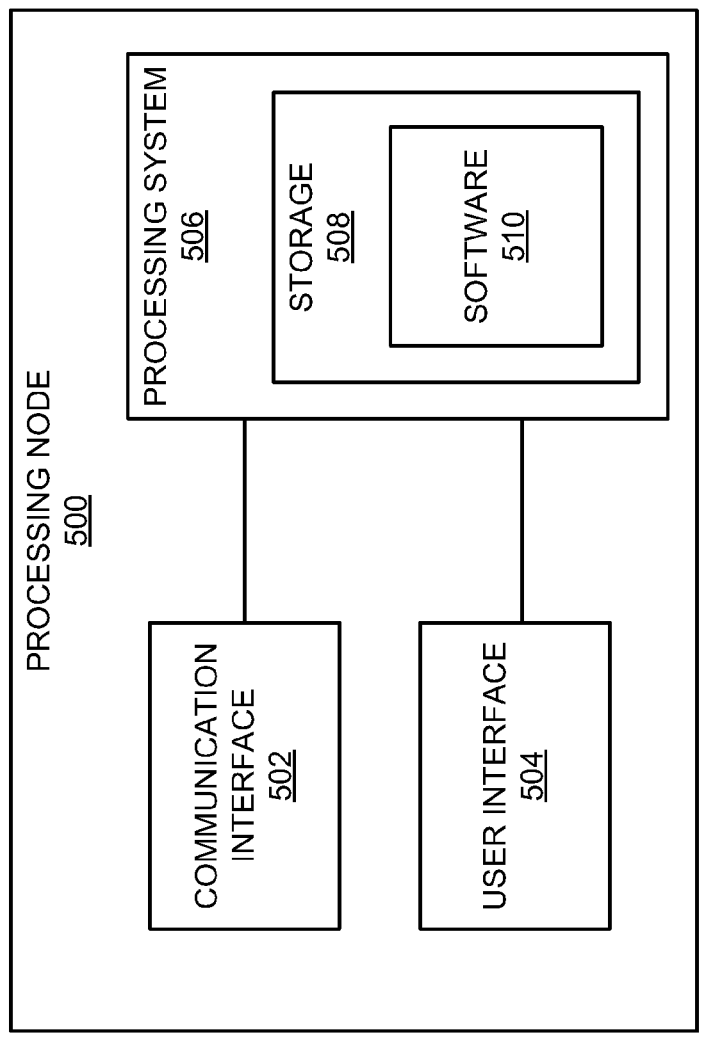
FIG. 5 illustrates a processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include access node 115 and access node 125. Processing node 500 can also be an adjunct or component of a network element, such as an element of network 120, access node 115, and/or access node 125, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of balancing load among wireless access nodes, comprising:
    calculating a plurality of load vectors each associated with one of a plurality of access nodes, each of the plurality of load vectors based on a plurality of network resource utilization indicators and a corresponding plurality of basis vectors for each of the plurality of network resource utilization indicators, wherein:
        the plurality of load vectors includes at least a first load vector associated with a first access node and a second load vector associated with a second access node; and
        the plurality of network resource utilization indicators includes a traffic load indicator that is based on a plurality of modulation and coding scheme indicators each associated with a plurality of wireless devices communicating with at least one of the plurality of access nodes;
    calculating a first magnitude of a first difference vector, the first difference vector being a vector difference between the first load vector and the second load vector; and,
    in response to the first magnitude meeting a threshold requirement, initiating a handoff of a wireless device between the first access node and the second access node.

2. The method of claim 1, wherein the plurality of network resource utilization indicators includes a user load indicator.

3. The method of claim 1, wherein the plurality of network resource utilization indicators includes a bearer load indicator.

4. The method of claim 1, wherein the plurality of load vectors includes third load vector associated with a third access node and the method further comprises:
    calculating a second magnitude of a second difference vector, the second difference vector being a vector difference between the first load vector and the third load vector; and,
    based on the second magnitude being less than the first magnitude, selecting the wireless device for handoff between the first access node and the second access node.

5. The method of claim 1, wherein the plurality of load vectors includes a third load vector associated with a third access node and the method further comprises:
    calculating a second magnitude of a second difference vector, the second difference vector being a vector difference between the first load vector and the third load vector;
    calculating a third magnitude of a third difference vector, the third difference vector being a vector difference between the second load vector and the third load vector; and,
    based on the first magnitude being greater than the second magnitude and the third magnitude, selecting the wireless device for handoff between the first access node and the second access node.

6. A communication system, comprising:
    a first access node, the first access node having a first active connection to a wireless device, the first access node being associated with a first load vector, the first load vector based on a first plurality of network resource utilization indicators and a corresponding plurality of basis vectors for each of the first plurality of network resource utilization indicators;
    a second access node, the second access node being associated with a second load vector, the second load vector based on a second plurality of network resource utilization indicators and the corresponding plurality of basis vectors for each of the second plurality of network resource utilization indicators; and,
    a processing node configured to determine a first magnitude of a vector difference between the first load vector and the second load vector, the processing node also configured to cause a handoff of a wireless device between the first access node and the second access node in response to the first magnitude meeting a threshold requirement,
    wherein, the first plurality of network resource utilization indicators and the second plurality of network resource utilization indicators include traffic load indicators that are based on a plurality of modulation and coding scheme indicators each associated with a plurality of wireless devices communicating with the first access node and the second access node.

7. The communication system of claim 6, wherein the first plurality of network resource utilization indicators and the second plurality of network resource utilization indicators include user load indicators.

8. The communication system of claim 6, wherein the first plurality of network resource utilization indicators and the second plurality of network resource utilization indicators include bearer load indicators.

9. The communication system of claim 6, further comprising:
a third access node, the third access node being associated with a third load vector, the third load vector based on a third plurality of network resource utilization indicators and a corresponding plurality of basis vectors for each of the third plurality of network resource utilization indicators, and the processing node is configured to determine a second magnitude of a vector difference between the first load vector and the third load vector, the processing node also configured to select the wireless device for handoff between the first access node and the second access node based on the second magnitude being less than the first magnitude.

10. The communication system of claim 6, further comprising:
a third access node, the third access node being associated with a third load vector, the third load vector based on a third plurality of network resource utilization indicators and a corresponding plurality of basis vectors for each of the third plurality of network resource utilization indicators, and the processing node is configured to determine a second magnitude of a vector difference between the first load vector and the third load vector, and to determine a third magnitude of a vector difference between the second load vector and the third load vector, the processing node also configured to select the wireless device for handoff between the first access node and the second access node based on the first magnitude being greater than the second magnitude and the third magnitude.

11. A method of operating a communication system, comprising:
determining a first vector difference between a first load vector associated with a first plurality of network resource utilization indicators that correspond to utilization of resources on a first access node and a second load vector associated with a second plurality of network resource utilization indicators that correspond to utilization of resources on a second access node;
determining a magnitude of the first vector difference; and,
based on the magnitude meeting a threshold requirement, selecting the first access node and the second access node for load balancing, wherein:
the load balancing includes ending a first active connection between the first access node and a wireless device and initiating a second active connection between the wireless device and the second access node; and,
the first active connection is selected to be ended based on a modulation and coding scheme associated with the wireless device.

12. The method of claim 11, wherein the first load vector and the second load vector are based on a plurality of basis vectors.

13. The method of claim 12, wherein at least two of the plurality of basis vectors are not orthogonal to each other.

14. The method of claim 11, wherein the first plurality of network resource utilization indicators and the second plurality of network resource utilization indicators include traffic load indicators associated with a plurality of wireless devices, user load indicators associated with the plurality of wireless devices, and bearer load indicators associated with the plurality of wireless devices.

* * * * *